United States Patent
MacWilliams et al.

(10) Patent No.: US 10,488,489 B2
(45) Date of Patent: Nov. 26, 2019

(54) METHOD FOR DETERMINING THE LOCATION OF A MOBILE DEVICE WITHIN A BUILDING, AND APPARATUSES FOR PERFORMING SAME

(71) Applicant: SIEMENS AKTIENGESELLSCHAFT, München (DE)

(72) Inventors: Asa MacWilliams, Fuerstenfeldbruck (DE); Corina Kim Schindhelm, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 340 days.

(21) Appl. No.: 14/780,454

(22) PCT Filed: Mar. 6, 2014

(86) PCT No.: PCT/EP2014/054298
§ 371 (c)(1),
(2) Date: Sep. 25, 2015

(87) PCT Pub. No.: WO2014/154459
PCT Pub. Date: Oct. 2, 2014

(65) Prior Publication Data
US 2016/0047882 A1 Feb. 18, 2016

(30) Foreign Application Priority Data

Mar. 28, 2013 (DE) .................. 10 2013 205 547

(51) Int. Cl.
*G01S 3/02* (2006.01)
*G01S 5/02* (2010.01)
(Continued)

(52) U.S. Cl.
CPC .......... *G01S 5/0263* (2013.01); *G01C 21/206* (2013.01); *G08B 13/19* (2013.01); *G08B 13/194* (2013.01)

(58) Field of Classification Search
CPC . G01S 5/02; G01S 5/0263; G01S 1/02; G01C 21/206; G08B 13/19; G08B 13/194
(Continued)

(56) References Cited

U.S. PATENT DOCUMENTS 7,042,391 B2 * 5/2006 Meunier ................. G01S 5/021
342/464
7,592,909 B2 * 9/2009 Zaruba ................... A61B 5/053
340/539.13
(Continued)

FOREIGN PATENT DOCUMENTS

DE 102011006180 A1 9/2012
DE 102013205547.1 3/2013
WO PCT/EP2014/054298 3/2014

OTHER PUBLICATIONS

International Search Report for PCT/EP2014/054298 dated Jun. 25, 2014.
(Continued)

*Primary Examiner* — Chuong P Nguyen
(74) *Attorney, Agent, or Firm* — Slayden Grubert Beard PLLC

(57) ABSTRACT

When an optical motion detector of a room device detects movement in a room in which it is installed, the room device transmits a radio message including its position. Upon receiving the radio message, a mobile device measures the signal strength to determine whether it is high. If the movement detected by the optical motion detector correlates chronologically with movement detected by an inertial movement sensor of the mobile device, the mobile device concludes that the mobile device is located in the room or in
(Continued)

proximity of the position of the room device. The identity of the mobile device is protected, as no server or other device is required for positioning to which the mobile device would have to disclose the identity, position or sensor information thereof.

9 Claims, 1 Drawing Sheet

(51) Int. Cl.
    *G01C 21/20*     (2006.01)
    *G08B 13/194*     (2006.01)
    *G08B 13/19*     (2006.01)

(58) Field of Classification Search
    USPC .............. 342/450; 701/434; 340/539.13, 541
    See application file for complete search history.

(56) References Cited

U.S. PATENT DOCUMENTS

| | | | | |
|---|---|---|---|---|
| 8,155,664 | B2* | 4/2012 | McFarland | G08C 17/02 |
| | | | | 340/539.1 |
| 8,164,444 | B2* | 4/2012 | Anderson | A61B 5/1113 |
| | | | | 340/539.11 |
| 8,618,978 | B2* | 12/2013 | Torimoto | G01S 19/11 |
| | | | | 342/357.31 |
| 8,626,198 | B2* | 1/2014 | Das | G01S 5/0252 |
| | | | | 455/456.3 |
| 8,816,848 | B2* | 8/2014 | Marino | G01S 5/0252 |
| | | | | 340/539.13 |
| 8,907,782 | B2* | 12/2014 | Baker | G06F 19/322 |
| | | | | 340/539.12 |
| 9,084,013 | B1* | 7/2015 | Arini | H04N 21/44204 |
| 9,341,700 | B2* | 5/2016 | Amir | G01S 5/0263 |
| 9,408,040 | B2* | 8/2016 | Cooper | H04W 4/043 |
| 9,544,788 | B2* | 1/2017 | Haiut | G01S 13/003 |
| 9,730,029 | B2* | 8/2017 | Choudhury | G01S 5/021 |
| 2006/0217132 | A1* | 9/2006 | Drummond-Murray | |
| | | | | H04W 64/00 |
| | | | | 455/456.2 |
| 2008/0130604 | A1 | 5/2008 | Boyd | |
| 2010/0250727 | A1* | 9/2010 | King | G01S 5/0027 |
| | | | | 709/224 |
| 2011/0018687 | A1 | 1/2011 | Holm | |
| 2012/0223860 | A1* | 9/2012 | Leclercq | G01S 19/34 |
| | | | | 342/357.63 |
| 2013/0244693 | A1* | 9/2013 | Das | G01S 5/0252 |
| | | | | 455/456.1 |
| 2013/0293416 | A1* | 11/2013 | Waters | G01S 19/48 |
| | | | | 342/357.31 |
| 2013/0317944 | A1 | 11/2013 | Huang et al. | 705/26.61 |
| 2014/0073349 | A1 | 3/2014 | Schunk | |
| 2014/0274119 | A1* | 9/2014 | Venkatraman | H04W 4/043 |
| | | | | 455/456.1 |
| 2015/0334504 | A1* | 11/2015 | Donaldson | H04S 7/303 |
| | | | | 381/307 |
| 2015/0341233 | A1* | 11/2015 | Marri Sridhar | H04W 4/70 |
| | | | | 370/252 |
| 2016/0003949 | A1* | 1/2016 | Venkataraman | G01S 19/22 |
| | | | | 342/357.29 |
| 2016/0077189 | A1* | 3/2016 | Elias | G01S 5/0263 |
| | | | | 455/456.6 |
| 2016/0238690 | A1* | 8/2016 | Colucci | G01S 1/68 |
| 2017/0111763 | A1* | 4/2017 | Morgan | H04W 4/029 |
| 2017/0138742 | A1* | 5/2017 | Teicher | G01C 21/206 |

OTHER PUBLICATIONS

German Office Action for Appln. No. 102013205547.1 dated Sep. 23, 2013.

* cited by examiner

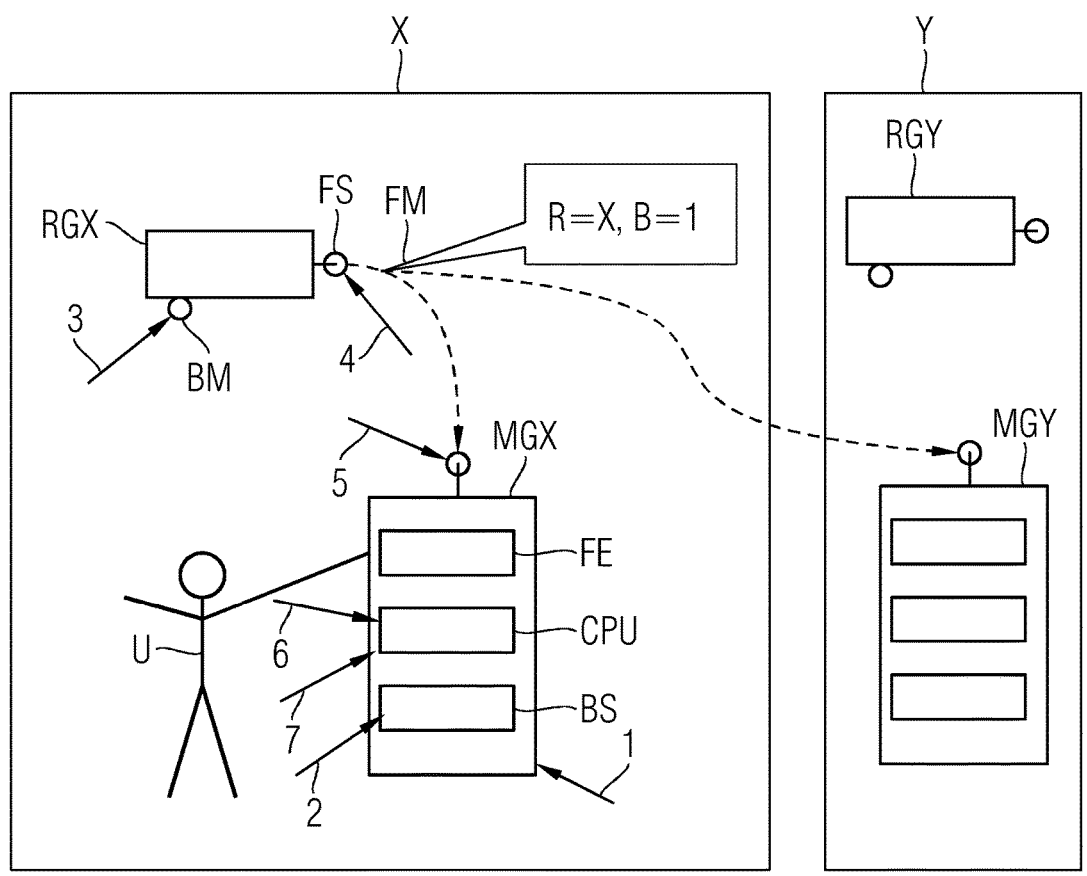

METHOD FOR DETERMINING THE LOCATION OF A MOBILE DEVICE WITHIN A BUILDING, AND APPARATUSES FOR PERFORMING SAME

CROSS REFERENCE TO RELATED APPLICATIONS

This application is the U.S. national stage of International Application No. PCT/EP2014/054298, filed Mar. 6, 2014 and claims the benefit thereof. The International Application claims the benefits of German Application No. 102013205547.1 filed on Mar. 28, 2013, both applications are incorporated by reference herein in their entirety.

BACKGROUND

Described below I a method for determining the location of a mobile device within a building, in which the mobile device receives position information from room devices.

Local beacons that are installed in rooms and that transmit an ID for a room, for example RFID tags, small Bluetooth or infrared transmitters, QR codes or the like are known. In all these cases, this requires a mobile device to have a reading or reception unit in order to identify these local beacons, however.

In addition, terminal-based radio positioning, e.g. by Wi-Fi, is known. For this, the mobile device has a map containing field strengths and positions of radio transmitters, e.g. Wi-Fi access points, and it then uses currently measured field strengths to compute a probable position. This method is highly computation intensive, however, and requires field strength maps that are as up to date as possible.

Likewise based on the same technology but more widespread is server-based radio positioning, also by Wi-Fi, for example. In this case, the positioning computation is performed by a server, however, which is problematic for the privacy of the user of the mobile device.

A further known method on mobile devices uses compasses, inertial sensors and gyroscopes in order to record the movement and orientation of the mobile device and to compute a position therefrom.

This method is usually too imprecise when taken on its own and is therefore often combined with other methods.

SUMMARY

Described below is a method for determining the location of a mobile device, for example a Smartphone, in which as little additional effort as possible is involved in being able to determine the position of the mobile device or of the user thereof within a building in a manner that is precise in terms of the room and as secure as possible against eavesdropping, that is to say without the user position being able to be monitored extraneously.

The method for determining the location of a mobile device within a building uses an inertial motion sensor of a mobile device and an optical motion detector of a room device installed in a room to identify a movement in the room, in which the respective room device sends a radio message containing its own position and the respective mobile device receives this radio message and in so doing measures the signal strength thereof, and in which the mobile device identifies when the signal strength of the radio message just received is high and when the movement established by the motion detector and the movement established by the motion sensor have a temporal correlation, and concludes therefrom that the movement just reported in the at least one room is probably its own and that the mobile device is situated in the room or in proximity to the position of the room device.

The identity of the mobile device in question is protected, because no servers or the like are needed for positioning, to which the mobile device would need to disclose its identity, position or sensor information.

BRIEF DESCRIPTION OF THE DRAWINGS

These and other aspects and advantages will become more apparent and more readily appreciated from the following description of an exemplary embodiment, taken in conjunction with the accompanying drawing of which:

the single drawing is a block diagram of two rooms, each containing a room device and a mobile device.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

The arrangement illustrated in the drawing includes a room device RGX that is installed in a room X of a building and that has an optical motion detector BM and a radio transmitter FS, and also includes a mobile device MGX that belongs to a user U and that has an inertial motion sensor BS, a radio receiver FE and a computation unit CPU.

The drawing shows the user U with the associated mobile device likewise in the room X. In a further room Y of the building, a further installed room device RGY and a further mobile device MGY are shown by way of example.

The identity of the mobile device MGX is protected.

A mobile device that is not involved, for example the further mobile device MGY, and that listens in on the radio message FM, for example from the further room Y, cannot infer the identity of the mobile device MGX.

No further servers or the like are needed for positioning, to which the mobile device would need to disclose its identity, position or sensor information.

In addition, the drawing indicates the method at the relevant points of the apparatus in arrow form.

As indicated by arrow 1, the mobile device is moved by the user U within the room X, whereupon the motion sensor BS of the mobile device MGX identifies a movement by the device MGX, as indicated by arrow 2 and the motion detector BM of the room device RGX identifies a movement in the room X, as indicated by arrow 3.

The room device RGX then sends a radio message FM from radio transmitter FS, as indicated by arrow 4, containing its own position, particularly the label of the room X (R=X), and containing an indication that a movement has been identified (B=1).

As indicated by arrow 5, the mobile device MGX receives the radio message FM and in so doing measures the signal strength thereof.

The computation unit CPU of the mobile device MGX then uses a statistical method to identify, as indicated by arrow 6, firstly that the signal strength of the radio signal just received is high and secondly that the movement established by the motion detector BM of the room device RGX and the movement established by the motion sensor BS of the mobile device MGX have a temporal correlation.

As indicated by arrow 7, the computation unit CPU of the mobile device MGX then concludes that the movement just reported in room X is probably its own and that the mobile device MGX is in the room X and not in the adjacent room Y, for example.

The room device RGX may optionally be embodied as a Wi-Fi access point having an integrated motion detector, wherein the Wi-Fi access point sends the radio message FM as part of its normal access point radio beacons.

In addition, the room device RGX may optionally be embodied as a simple motion detector that communicates with another Wi-Fi access point by wire.

Optionally, the radio messages FM can be sent by the room device RGX whenever a movement has been identified or else can be sent periodically, for example approximately every 2 seconds, with, in the latter case, a time stamp for the largest movement or a time profile for the movements, for example over the last 2 seconds, advantageously being sent for the purpose of precise temporal correlation of the movements.

Optionally, the radio messages FM can also be sent in encrypted form, e.g. via a Wi-Fi network, such that they can be decrypted only by mobile devices having a radio key that is stipulated for the building. This prevents an attacker who is standing outside the building with a mobile device that does not belong to the building from listening in and being able to establish that a movement has taken place in the room X.

The method allows inexpensive room-precise location without adversely affecting the privacy of the user. The method can be implemented with mobile devices that are available today, e.g. a Smartphone with an inertial sensor and Wi-Fi. The room device can also be provided cheaply using sensors that are available today, e.g. in the form of a combination of a passive infrared motion detector and a Wi-Fi access point.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method for a mobile device to determine its position within a building, the method comprising:
   receiving a radio message with a receiver of the mobile device from a radio transmitter, the radio message containing position information of a motion detector installed in a room in the building based on object movement in the room detected by the motion detected;
   determining a signal strength of the radio message using a processor of the mobile device;
   comparing a time at which the radio message was sent by the radio transmitter to a time of a movement sensed by an inertial motion sensor in the mobile device for a temporal correlation using the processor; and
   if the comparison shows a temporal correlation, determining whether the signal strength of the radio message is higher than a threshold to conclude that the mobile device is situated in the room in proximity to the room device using the processor.

2. The method as claimed in claim 1, wherein the radio message includes a label identifying the room and an indication that the object movement has been identified.

3. The method as claimed in claim 1, wherein the radio message is sent by the room device whenever the object movement has been detected.

4. The method as claimed in claim 1, wherein the radio message is sent periodically by the room device with at least one of a time stamp for a largest movement and a time profile for movements detected since a previous radio message was sent.

5. The method as claimed in claim 1, wherein the radio message is encrypted and can be decrypted only by mobile devices having a radio key stipulated for the building.

6. An apparatus for determining location of a mobile device within a building, the apparatus comprising:
   an optical motion detector configured to detect movement in a respective room of the building;
   a radio transmitter configured to send a radio message in response to detecting movement, the radio message containing position information of a respective room device when movement is detected in the respective room; and
   a mobile device having an inertial motion sensor;
   wherein the mobile device is configured to compare a time at which the radio message was sent to a time of a movement sensed by the inertial motion sensor and, if the comparison shows a temporal correlation, to determine whether a signal strength of the radio message is higher than a threshold to conclude that the mobile device is situated in the respective room.

7. The apparatus as claimed in claim 6, wherein the room device is a Wi-Fi access point having an integrated motion detector, and
   wherein the Wi-Fi access point is configured to send the radio message as part of normal access point radio beacons.

8. The apparatus as claimed in claim 6, further comprising a Wi-Fi access point, and
   wherein the room device is a motion detector configured to communicate with the Wi-Fi access point by wire.

9. A mobile device comprising:
   an inertial motion sensor configured to detect movement of the mobile device;
   a radio receiver configured to receive a radio message from a room device, the radio message containing position information of the room device when a motion detector of the room device detects object motion in the room; and
   a hardware processor configured to compare a time at which the radio message was sent by the room device to a time of a movement detected by the inertial motion sensor and, if the comparison shows a temporal correlation, to determine whether a signal strength of the radio message detected by the radio receiver is higher than a threshold to conclude that the mobile device is situated in a room in proximity to the room device.

* * * * *